United States Patent [19]
DeHoff et al.

[11] 3,887,045
[45] June 3, 1975

[54] DISC BRAKE CALIPER ASSEMBLY AND METHOD

[75] Inventors: Edward J. DeHoff, Dayton; Donald M. Flory, Arcanum, both of Ohio

[73] Assignee: General Motors Corporation, Detroit, Mich.

[22] Filed: Apr. 12, 1974

[21] Appl. No.: 460,375

[52] U.S. Cl.............................. 188/73.3; 188/71.1
[51] Int. Cl............................................. F16d 65/02
[58] Field of Search ....... 188/73.3, 72.4, 72.5, 72.1, 188/73.4, 71.1; 29/446; 52/223 R

[56] References Cited
UNITED STATES PATENTS

| | | | |
|---|---|---|---|
| 2,873,005 | 2/1959 | Butler.............................. | 188/73.4 |
| 3,438,466 | 4/1969 | Meier................................ | 188/71.1 |
| 3,494,448 | 2/1970 | Ruprecht et al.................. | 188/72.1 |
| 3,554,000 | 2/1968 | Schwab............................. | 29/446 X |

FOREIGN PATENTS OR APPLICATIONS

| | | | |
|---|---|---|---|
| 1,079,911 | 8/1967 | United Kingdom................ | 188/73.3 |

*Primary Examiner*—George E. A. Halvosa
*Attorney, Agent, or Firm*—D. D. McGraw

[57] ABSTRACT

A disc brake caliper assembly has a caliper housing of generally U-shaped cross section, the housing being slidably mounted and guided on a fixed support member. One housing side section has an actuating chamber and piston which when pressurized moves a brake pad assembly into engagement with one side of a rotatable disc, reaction acting through the caliper housing to move another disc brake assembly into engagement with the other side of the rotatable disc. The brake pad assemblies are mounted in the caliper housing between the side sections. The brake apply forces tend to spread the caliper side sections apart. The caliper housing is therefore prestressed so that the prestress force must be overcome by the brake apply force before the brake apply force acts to contribute to any further spreading of the side sections. The prestressing of the caliper housing is accomplished by providing compressively loaded spacers between the side sections which hold the caliper side sections substantially parallel so long as the brake apply force tending to spread the side sections apart does not exceed the prestress force in the caliper housing tending to move the side sections toward each other. The disclosure includes the method of manufacturing a disc brake caliper so that it is prestressed, and the method of distributing caliper housing stresses during brake actuation and release.

3 Claims, 6 Drawing Figures

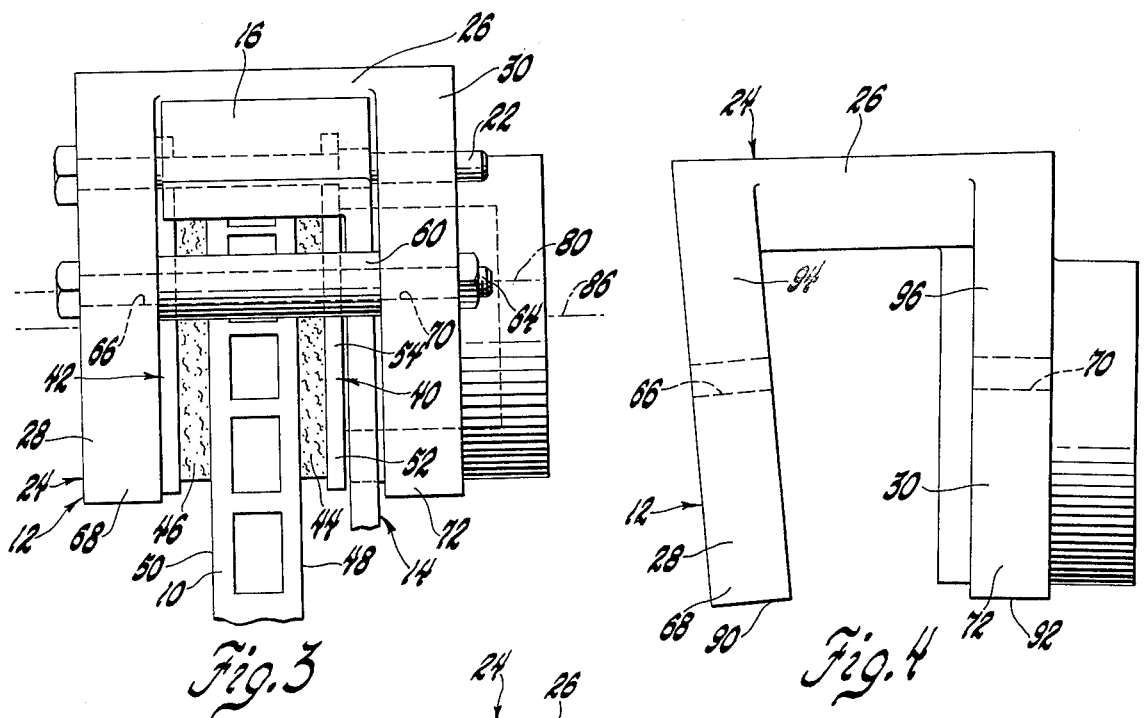
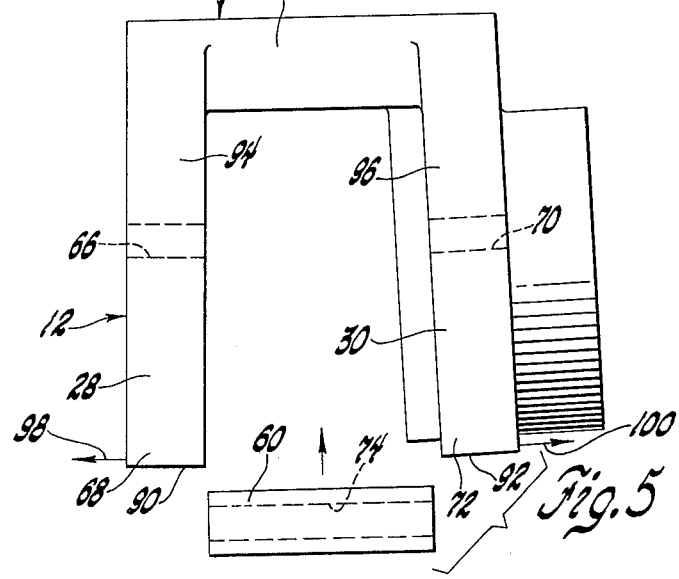
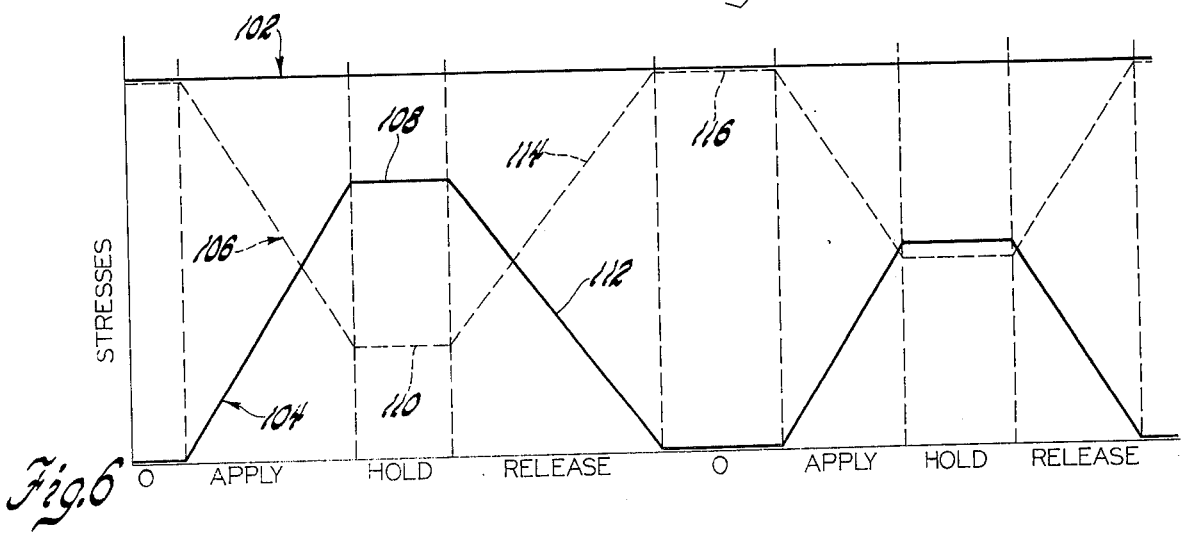

DISC BRAKE CALIPER ASSEMBLY AND METHOD

The invention relates to a disc brake assembly, a method of manufacturing a disc brake caliper, and a method of distributing caliper housing stresses during brake actuation and release to minimize caliper housing stress fatigue.

There are several types of disc brake assemblies which are commonly known and used on vehicles. These include closed loop calipers exemplified by U.S. Pat. No. 3,317,009-Warwick, issued May 2, 1967. In such calipers the brake apply forces act on opposite sides of a generally eliptical or oval shaped loop, placing the material forming the loop ends in tension. In some instances fixed calipers are utilized, with the loops being provided of cast or machined sections so that one or more actuating cylinders are positioned on each oppossed side. This type of caliper is exemplified by U.S. Pat. No. 3,388,775-Baynes et al., issued June 18, 1968.

Another type of caliper is that which is generally U-shaped in cross section so that the caliper housing is formed of a bridging section extending across the plane of rotation of the disc to be braked and adjacent either the disc inner or outer periphery. The bridging section joins the caliper side sections, which provide mounting and actuating means for the brake pad assemblies. Such a caliper may be slidably supported on a fixed support member and have actuating means provided in only one caliper side, or may have actuating means provided in each caliper side so that the caliper is fixed and the brake pad assemblies are moved relative to the caliper housing to frictionally engage the disc in braking relation. Patents exemplifying this type of brake are U.S. Pat. Nos. 3,628,639-Daley, Jr., issued Dec. 21, 1971, and 2,746,575-Kinchin, issued May 22, 1956. In this type of brake caliper, the side sections tend to be spread apart, with the side sections being cantilever loaded, the portion of the bridging section on one side of that section's neutral axis and peripherally adjacent the disc being loaded in tension, and the outer portion of the bridging section on the other side of that section's neutral axis and peripherally distant from the disc being loaded in compression. Calipers of this type, particularly for heavier vehicles such as those predominant in the United States, require heavy caliper sections in order to transmit the brake apply forces between the caliper side sections with minimum displacement loss due to deflection or spreading of the caliper side sections. The heavier the vehicle, the greater the brake forces required and the heavier the requirements fo the caliper housing.

Various attempts have been made to minimize caliper spread. These include different caliper designs such as the closed loop calipers noted above. They also include proposals to reinforce the caliper housing by various means. One such proposal is contained in U.S. Pat. No. 3,494,448 Ruprecht et al., entitled "Reinforced Brake" and issued Feb. 10, 1970. This patent discloses the reinforcement of the bridging section, or yoke portion, of a U-shaped caliper housing by providing a pretensioned bolt extending through the neutral axis of the bridging section. The pretensioned bolt resists bending of the bridging section which connects the leg portions. However, actuation of such a reinforced brake will still allow the legs or side sections to spread or deflect to an extent determined by the modulus of the material from which the caliper housing is made. The caliper housing would still be subjected to stresses of sufficient amplitude to cause stress fatigue.

It is an object of the invention to prestress a brake caliper housing against side section deflection to reduce or eliminate deflection losses during brake operation.

It is a more particular object of the invention to prestress a caliper housing so that the brake apply forces tending to cause deflection or spreading of the caliper side sections are resisted in accordance with the modulus of spacer means held in compression by the prestressed forces instead of the modulus of the material of which the caliper housing is made.

It is another object of the invention to provide a method of making a disc brake caliper which is prestressed and retained in a prestressed condition by spacers which are compressively loaded by the prestress forces, the prestress forces being at least as great as the stress exerted on the caliper side sections tending to expand or deflect the side sections during brake actuation.

It is still another object of the invention to provide a method of distributing caliper housing stresses in a disc brake caliper housing during brake actuation and release to minimize caliper housing stress fatigue.

The invention particularly relates to a brake in which the caliper housing has a substantially U-shaped cross section composed of a yoke or bridging section and a pair of side sections or leg portions located on opposite sides of a rotatable disc to be braked; suitable brake actuating means, such as a fluid motor, mounted on at least one of the leg portions; and oppositely acting brake pad assemblies respectively mounted between the leg portions so that they are actuatable to frictionally engage the sides of the brake disc in braking relation when the actuating means is energized.

When the actuating means is energized, the actuating means being a hydraulic motor by way of example, the piston of the hydraulic motor and the hydraulic reaction on the motor cylinder end wall act to move the brake pad assemblies into frictional contact with the opposite sides of the brake disc, the reaction of the braking forces acting on the side sections of the caliper housing and tending to deflect the side sections. This deflection is in a spreading or expanding direction, the caliper tending to open wider at the open end of the U-shaped cross section. The deflection forces act on the side sections with the side sections being in cantilever relation to the bridging section. The bridging section has a neutral axis on one side of which the material forming the bridging section is in tension and on the other side of which the material is in compression.

The caliper housing side sections are prestressed so that they tend to decrease the U-shaped opening as viewed in cross section. Spacers or expanders are placed between the side sections so that the prestressed forces load them in compression and the side sections are substantially parallel. The axes of the spacers or expanders lie in a plane which passes through the actuating means and preferably as close to the axis of effective brake actuating force application of the actuating means as is reasonably practical. The deflection of the caliper side sections then depends upon the modulus of the material of which the spacers or expanders are made rather than the modulus of the material of which the caliper housing is made, until brake actuating forces exerted by the actuating means overcomes all of the prestressed forces and relieves all of the compression forces acting on the spacers or expanders. This will greatly reduce caliper housing deflection losses, and when the prestress forces are at least as great as the brake actuating forces, deflection losses will be substantially eliminated. The caliper housing will therefore not be subjected to stress fatigue. The substantial decrease in deflection loss will minimize the brake fluid displacement requirements of the brake master cylinder or the requirements of other brake power means utilized to energize the actuating means.

IN THE DRAWINGS:

FIG. 3 is an end view of the disc brake assembly of FIG. 1 with parts broken away, and taken in the direction of arrows 3—3 of that figure. It illustrates the U-shaped cross section configuration of the caliper housing.

FIG. 4 is a somewhat schematic illustration of an end view of the caliper housing of the brake mechanism of FIG. 1, illustrating the caliper housing in one stage of construction.

FIG. 5 is a view similar to FIG. 4 and schematically shows the caliper housing in another stage of construction.

FIG. 6 is a graph indicating the stresses in the caliper housing during brake apply, hole, release, and released stages of brake operating cycles.

Figure 1:
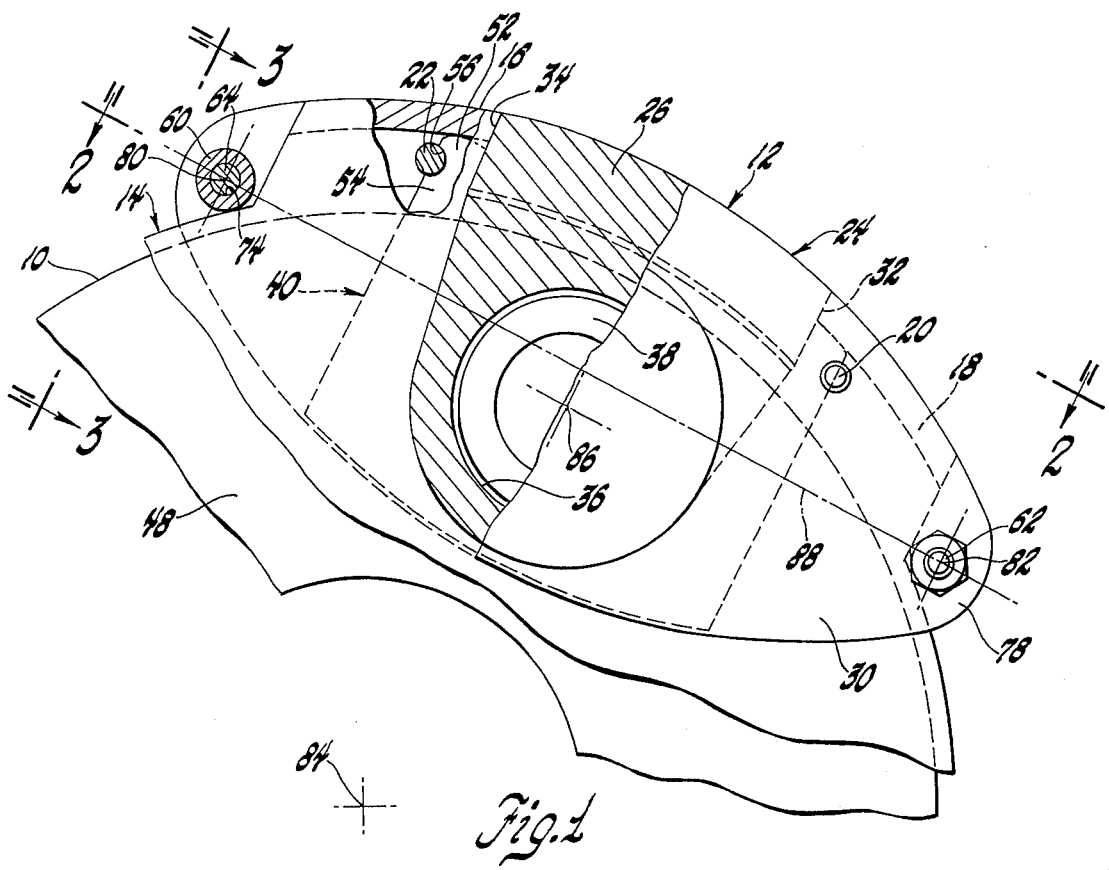
FIG. 1 is an elevation view, with parts broken away and in section, of a disc brake assembly embodying the invention.

The brake assembly shown in the drawings includes a disc 10, a caliper assembly 12, and a mounting bracket 14. The caliper assembly is mounted on the mounting bracket and the mounting bracket takes brake torque from the caliper. The mounting bracket has brake torque receiving abutments 16 and 18 and also has guide pins 20 and 22 secured thereto and supporting and guiding the caliper assembly 12. This arrangement may be like that shown in U.S. Pat. No. 3,628,639, mentioned above, and reference is made to that patent for details of the housing supporting and guiding arrangement.

The caliper assembly 12 includes a house 24 having a bridging or yoke section 26 joining an outboard leg or side section 28 and an inboard leg or side section 30. As is better illustrated in FIGS. 3, 4 and 5, the caliper housing is substantially U-shaped in cross section and as viewed from one end.

The edge surfaces 32 and 34 of the bridging section, which are circumferentially spaced relative to the disc 10 and extend transversely across the disc, provide abutment surfaces which engage the torque taking abutments 16 and 18 of mounting bracket 14. The inboard side section 30 has a hydraulic brake actuating cylinder 36 which is illustrated as being formed as a part of the side section. As is well known in the art, it may be separately made and secured to the side section. The cylinder contains piston 38 which is actuated by introducing hydraulic brake pressure into the cylinder in a manner well known in the art.

The caliper assembly includes an inboard brake pad assembly 40 and an outboard brake pad assembly 42 which are positioned on opposite sides of the disc 10 and between the caliper side sections 28 and 30. The brake pad assemblies respectively include brake linings 44 and 46, which respectively engage the disc friction braking side surfaces 48 and 50 in friction braking relation when the brake is actuated. The inboard brake pad assembly 40 has a lug 52 formed on each end of the brake shoe 54 forming a part of the assembly 40. Each lug 52 is notched at 56 so that one of the guide pins 20 or 22 sets in the notch. The guide pins therefore act as locators and retainers for the housing. The outboard brake pad assembly is similarly constructed. The lugs also engage abutment surfaces 32 and 34 to transmit brake torque from the brake pad assemblies to the caliper housing.

Figure 2:
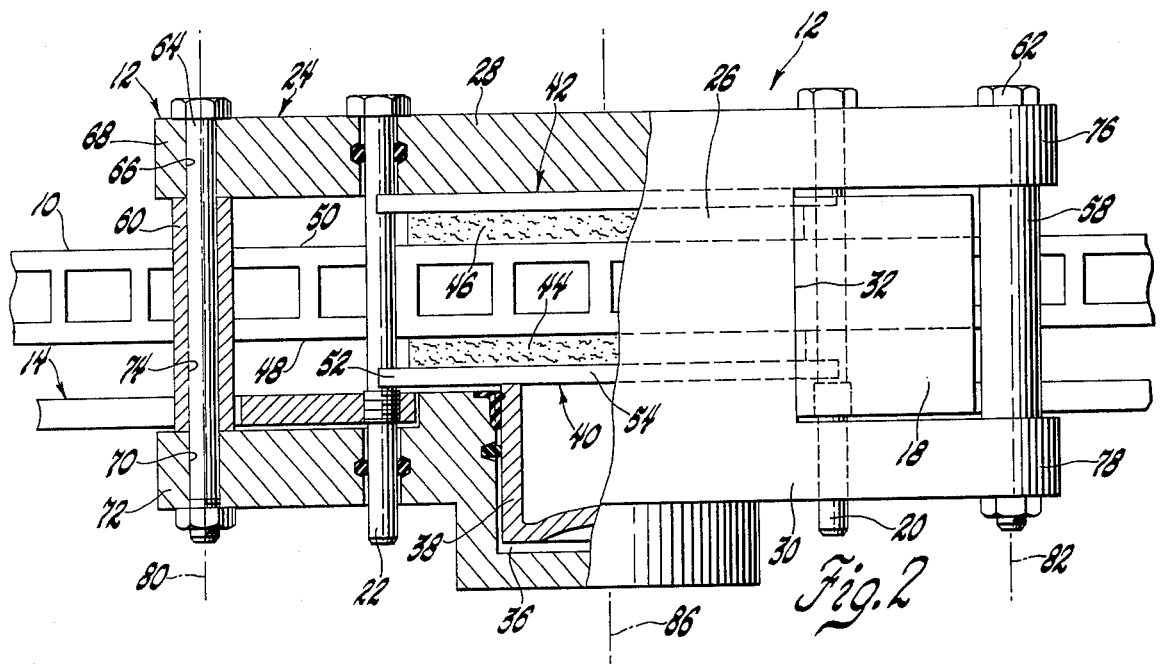
FIG. 2 is a plan view, taken in the direction of arrows 2—2 of FIG. 1, illustrating the disc brake assembly of that figure with parts broken away and in section.

Spacers or expanders 58 and 60 are provided between the caliper side sections 28 and 30. The spacers act in compression to prestress the caliper housing. They are respectively retained in place by pins 62 and 64. The pins extend through aligned apertures formed in ears provided on either end of the caliper housing side sections. This is particularly illustrated in FIG. 2, wherein pin 64 extends through aperture 66 of the ear 68 provided on one end of caliper housing side section 28. The pin also extends through aperture 70 provided in ear 72 on one end of caliper housing side section 30. The spacer 60 is cylindrically formed with a bore 74 through which pin 64 extends. The spacer 58 and its pin 62 are similarly mounted relative to ears 76 and 78 respectively provided on the other circumferentially spaced ends of the caliper housing side sections 28 and 30. The common axis 80 of pin 64, apertures 68 and 70, and bore 74 of spacer 60; and the similar common axis 82 of pin 62 and spacer 58; extend axially parallel to the axis of rotation 84 of the disc 10 and the axis 86 which is the axis of cylinder 36 and is also the effective center of force application of the piston 38 and the cylinder 36. The plane 88 containing axes 80 and 82 passes through the cylinder 36 and piston 38 and as close as is reasonably practical to their common axis 86. Thus the prestressed compression forces acting through spacers 58 and 60 act in a plane which is close to the effective center of the brake actuating forces generated when pressure is provided in chamber 36. It is noted that this plane is spaced radially inward at a substantial distance from the caliper housing bridging section 26.

FIGS. 4 and 5 are schematic illustrations showing a method by which the caliper housing 24 is prestressed. The housing is formed so that the side sections 28 and 30 are not parallel, but have their outer ends 90 and 92 somewhat closer together than their inner ends 94 and 96, where these inner ends join bridging section 26. The actual relationship of the side sections is overemphasized in the Figures for clarity. Spreading forces are provided which act on side sections 28 and 30 as diagramatically illustrated by arrows 98 and 100 in FIG. 5. These spreading forces deflect the side sections 28 and 30 to a more open position to a sufficient extent to permit the installation of the spacers 58 and 60. These spreading forces are preferably greater than the forces normally exerted during braking operation by actuation of the brake and tending to spread the wide sections apart. The spreading forces are always less than the force required to cause a permanent set of the caliper housing. After the spacers are moved into position so that their bores are axially aligned with the apertures in the ears associated with the spacers, the forces represented by arrows 98 and 100 are removed and the side sections clamp against the ends of spacers 58 and 60, the pins 62 and 64 being inserted to assure axial alignment of the spacers and the apertures and to hold the spacers in position. The spacers 58 and 60 are therefore compressively loaded, prestressing the caliper housing to the extent that the prestress forces are equal to those forces required to move the side sections from the position shown in FIG. 4 to the substantially parallel position shown in FIG. 3.

In the preferred embodiment of the invention the prestress forces in the housing are at a force level above that which the caliper housing experiences in brake operation due to brake actuation. It is also recognized that in some housings the amount of prestress provided maybe somewhat less than the maximum brake operating force which may occur. However the prestress forces should approach such maximum apply forces to the extent practical in order to gain full advantage from the invention.

The graph of FIG. 6 shows the prestress levels and the brake apply levels when the prestress levels are greater than those obtained during brake apply. The continuous stress level of the caliper housing is illustrated by line 102. The brake apply forces are illustrated by curve 104, and the net prestress force in the caliper housing is illustrated by curve 106. The curves are plotted against braking cycles of brake apply, brake hold, brake release, and fully released brake conditions. When the caliper housing in the disc brake assembly has been prestressed to the force level represented by line 102, and the brake is not actuated, the net prestress level represented by curve 106 is at that of line 102. When the brake is actuated, the brake apply force increases, following the rising portion of curve 104 illustrated during the brake apply portion of the first cycle shown in the graph. The total of the brake apply forces and the net prestress force in the caliper housing is always that of the continuous stress level established by line 102. Thus, as the brake apply forces increase, the compression forces acting through spacers 58 and 60 decrease, following the comparable portion of curve 106. When the brake reaches the hold position illustrated by the portion 108 of curve 104, the brake apply forces have absorbed a major portion of the prestress level represented by the portion of curve 106 at line 102 and the compression forces exerted by the caliper housing side sections through the spacers have decreased to the level illustrated by portion 110 of curve 106. It will be noted that the actual continuous stress level in the caliper housing has not changed. The only change that has occurred is the manner in which the forces are distributed in the caliper housing.

It is recognized that this arrangement is theoretically correct but is not as a practical matter entirely accomplished since the prestress forces in fact act along axes 80 and 82 while the brake apply forces act effectively along axis 86. However, subject to structural arrangements and limitations, these forces act in accordance with the described arrangement.

As the brake is being released, the brake apply forces decrease along the portion 112 of curve 104 and the prestress forces in the caliper housing as exemplified by the compression forces acting on spacers 58 and 60 follow the portion 114 of curve 106. When the brake is fully released, the continuous stress level represented by line 102 is again obtained only by the prestress forces in the caliper housing. This is illustrated by portion 116 of curve 106.

The second cycle illustrated in FIG. 6 is that of a somewhat lesser brake apply operation. It is otherwise quite similar to the relatively severe or possibly maximum brake apply cycle illustrated in the first portion of the graph.

The total of the stresses in any brake condition illustrated by curves 104 and 106 is the same as the total continuous stress illustrated by line 102. Therefore the caliper housing remains constantly stressed at the continuous stress level of line 102 and there is no cyclical stress on it. This substantial elimination of cyclical stress amplitude minimizes fatigue of the caliper housing resulting from stress changes. It is recognized that there will be a small amount of stress change occurring since the caliper side sections will be deflected to a very minor extent in accordance with the modulus of the spacers 58 and 60 due to the changes in compressive loading on the spacers during brake actuation and release. However, this deflection is much less than the deflection would be if the deflection related to the modulus of the caliper housing side sections and bridging section, and the stress amplitude on the caliper housing is minimal so that the caliper housing does not experience stress fatigue.

What is claimed is:

1. A disc brake assembly comprising:
    a caliper housing of generally U-shaped cross section and having a bridge section and a pair of legs joined by said bridge section;
    oppositely acting brake pad assemblies on said pair of legs;
    a brake actuator associated with one of said brake pad assemblies and on one of said legs and movable when actuated to exert brake apply forces through said caliper housing and said brake pad assemblies tending to spread said legs;
    and spacer means for said pair of legs extending therebetween in compression preload and prestressing said caliper housing by holding said legs in substantially parallel relation, the amount of prestress forces being required to be taken up by actuation of said actuator before said brake apply forces exerted through said caliper housing act to tend to spread said legs beyond the spread thereof established by the compression preload of said spacer means, said spacer means acting in a plane extending transversely through said legs and said brake actuator and parallel to but spaced from said bridge section.

2. A disc brake assembly comprising:
    a rotatable disc to be braked and having friction braking surfaces on opposite sides thereof;
    a fixed caliper support member adjacent one side of said disc;
    a caliper housing having a generally U-shaped cross section defined by first and second spaced side sections and a bridging section joining said side sections, said housing being carried by said fixed support member and receiving said disc between said side sections;
    first and second brake pad assemblies received in said caliper housing respectively adjacent said first and second side sections for friction braking engagement with said disc friction braking surfaces;

brake actuating means in at least one of said side sections and acting when actuated to cause said brake pad assemblies to compressively engage said disc in friction braking relation, the brake applying forces generated by said brake actuating means acting on said caliper housing transversely of said disc to tend to separate said side sections;

said caliper housing side sections extending arcuately of and substantially parallel to said disc braking surfaces and provided with ears on the arcuate ends thereof, said ears having a pair of aligned apertures in each of the adjacent pair of ears of said side sections, said pairs of apertures having substantially parallel axes which are substantially parallel to the axis of rotation of said disc and lie in a common plane which passes through said actuating means and chord of said disc;

a pair of cylindrical spacers each having a bore axially aligned with one of said pair of apertures with the ends of said spacers engaging said side sections in compressive spacer loading to prestress said caliper housing at a predetermined force level whereby the brake applying forces generated by said brake actuating means and tending to spread said side sections apart must exceed said predetermined force level before any brake actuating means generated forces contribute to further spreading of said side sections;

and retaining means extending through said ear apertures and said spacer bores and retaining said spacers in axial alignment with said apertures.

3. The method of distributing caliper housing stresses in a disc brake caliper housing during brake actuation and release to minimize caliper housing stress fatigue comprising the steps of:

a. prestressing the caliper housing during caliper assembly in the directions of stress application during brake actuation to a stress level higher than that which will occur during brake actuation, b. providing compressively loadable members as a part of the caliper housing which hold the prestressed caliper housing in the aforesaid prestressed condition and have compressively loaded forces exerted thereon accordingly, c. and exerting brake application forces on the caliper housing by brake actuating means which during brake actuation relieve the forces acting on the compressively loaded members to the extent that the brake application forces absorb the prestressed loading forces so that the total stresses acting on the caliper housing remain substantially constant at all times whereby stress fatigue of the caliper housing is substantially eliminated.

* * * * *